July 6, 1937.  K. KOHL  2,086,423

RECEPTION OF ULTRA-SHORT WAVES

Filed Jan. 7, 1935

Inventor:
K. Kohl
By Glascock Downing & Seebold
Attys.

Patented July 6, 1937

2,086,423

UNITED STATES PATENT OFFICE 2,086,423

RECEPTION OF ULTRA-SHORT WAVES

Karl Kohl, Erlangen, Germany, assignor, by mesne assignments, to N. V. Machinerieen-en Apparaten Fabrieken "Meaf", Utrecht, Netherlands Application January 7, 1935, Serial No. 766
In Germany January 16, 1934

5 Claims. (Cl. 250—27)

This invention is directed to a method of receiving ultra-short waves by means of triode tubes having a braking field circuit.

An object of this invention is to create an improved method of operating systems involving Barkhausen-Kurz or braking field circuits for the reception of ultra-short waves.

Another object of this invention is to produce an improved method of operating triode tubes by means of which high sensitivity and amplification of incoming ultra-short waves is obtained, and further by means of which one tube acts simultaneously as a detector and an amplifier.

A further object of this invention is to form novel tube circuits to be used in conjunction with the new method.

The means by which the objects of my invention are realized is fully set forth in the following description of several forms of the invention.

Figure 1:
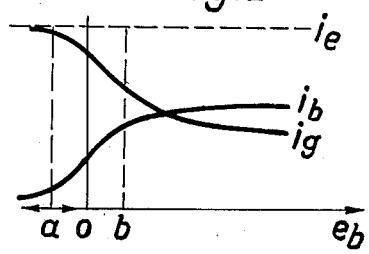
Fig. 1 is a graphic showing of the detector section of the braking audion.

It is well known that in triode tubes which are operated in a braking field circuit, the grid electrode receives a high positive potential with respect to the cathode, and the braking electrode a small negative potential with respect to the cathode. It is known in these tubes, that the electrons emitted by the cathode describe for the most part a pendulous or oscillatory movement about the positive potential grid electrode because they are, as a result of their own negative charge, repelled by the likewise negative potential braking electrode and by the negative space charge in front of the cathode. A part of the electrons, however, inasmuch as the velocity or energy of the electrons is great during the oscillatory movement while the negative potential of the braking electrode is but weak, fly to the braking electrode. In this manner a current is always produced from the braking electrode to the cathode. The main current flows from the grid electrode to the cathode. This main current is produced by those electrons which, after some oscillations about the highly positive grid electrode, drop on the grid electrode itself. This subdivision of the current in a braking field tube with the hitherto usual weak negative potential braking electrode is explained with reference to Fig. 1. Therein the axis $e_b$ designates the braking electrode potential, adjusted for example to the negative value $a$. The curve $i_g$ designates the current from the grid electrode to the cathode, the curve $i_b$ the current from the braking electrode to the cathode, and the dotted line $i_e$ the total emission current of the tube, and being composed of $i_b$ plus $i_g$. Let it now be assumed that ultra-high frequency signals come to the receiving apparatus of the tube. The result is that the braking electrode potential fluctuates for the value $a$ on the axis $e_b$, as shown by the arrows of Fig. 1. It is seen that each thereby resulting variation of the grid current $i_g$ corresponds to a reverse variation of the braking electrode current $i_b$, that is: if the braking electrode potential is positive, the braking electrode current increases and the grid electrode current decreases; if the braking electrode potential is negative the braking electrode current decreases and the grid electrode current increases. However, both currents are always added to make the total emission current $i_e$.

As shown on Fig. 1, the $i_b$ curve as well as the $i_g$ curve has a bent characteristic. Detection of the received signals takes place by reason of the bent characteristic of the braking electrode current as well as the bent characteristic of the grid electrode current. Thus, in the demodulation, low frequency alternating currents or alternating potentials arise between the cathode and the braking electrode and between the cathode and the grid electrode. If amplification is also desired, the ultra-high frequency oscillatory current must be undamped, which can be insured by means of suitably selected operative potentials and a suitable corresponding emission of the incandescent cathode.

It is well known that reception can be obtained only by considering the position of the reception range of the tube, that is, when potentials of accurately predetermined magnitude are given the grid and braking electrode with respect to the cathode. Heretofore use has been made only of those reception ranges which only require weak negative braking electrode potentials. However, and as precedingly stated, with these weak negative braking electrode potentials a current passes from the braking electrode to the cathode. This current flux over the braking electrode is very injurious to the reception. Through its occurrence the receiving circuit is loaded and thus rendered so insensitive to weak signal oscillations that they cannot be received. As a result of this loading, a high degree of undamping of the oscillatory circuit is impossible, and thus substantial amplification is also impossible. Moreover, this undesirable current over the braking electrode means a withdrawal of energy-rich electrons from the oscillating space charge, without these electrons having taken any substantial part in the oscillation. On the contrary, they have flown directly, or after a few pendulous movements, to the braking electrode and are thus lost to the oscillatory operation. The greatest difficulty was found when an endeavor was made to use the same tube as a receiving rectifier as well as an amplifier. In the hitherto exclusively used weak negative braking electrode potentials it was impossible to obtain detection as well as amplification at the same time without mutual destruction of the effects. It was therefore necessary to use two separate tubes, one for rectifying only and the other for amplifying only. Or, if one tube was used, only a poor reception was obtained.

According to the new method of the instant invention the braking electrode is provided with such a high negative potential as to preclude a current passing from the braking electrode to the cathode.

The new method of the present invention is based on the discovery of reception ranges which lie in the area of extremely high negative braking electrode potentials, and thus can pass over only with the aid of these very high negative potentials for the braking electrode. The method of the present invention has a number of important advantages.

As there is no current flow over the braking electrode, there is no load on the oscillatory circuit. The latter can therefore be excited to oscillations with undamped amplitudes. The amplification, which becomes greater as the damping decrement becomes smaller, is very high. As is known, an oscillatable structure can obtain higher resonance amplitudes and respond to predetermined frequencies the more sharply, the more undamped it is. This principle has not prior to this invention been applied to receiver tubes. Complete undamping of the receiver system is possible through the method of the present invention. It is shown hereinafter, by means of an example, how high the amplification can be made.

Another advantage of the invention consists in that amplification and detection do not mutually destroy each other. In this manner it is possible to obtain the highest degree of sensitivity, a maximum amplification, and detection with one and the same tube. In order that the detector effect take place it is necessary that, through suitable selection of the operative conditions of the ultra short wave tube, the oscillatory circuits connected with the electrodes be undamped by the electron movement. The operative potentials at the electrodes must be selected so that the oscillation period of the electron movement is an even multiple of the oscillation period of the operative circuit. How the detector effect in a tube provided with the extremely high braking field potential of the new method, and in which the operative conditions are set in the manner described, proceeds, is shown hereinafter.

Another advantage of the invention consists in that electrons are no longer withdrawn from the oscillating space charge by striking against the braking electrode, as none of the electrons which move about the positive grid electrode fly up to the braking electrode to be diverted there as a braking electrode current to the cathode.

As precedingly stated, the amplification can be made the greater the smaller the damping decrement. The latter is known as the measure for the decrease in the amplitude of two successive oscillations. The following is an example of the amplification obtained:

If alternating voltages having a phase relation of 180° with respect to each other appear on the grid and braking electrode, amplification will take place if the ultra-high frequency circuit is undamped. If $\Delta e$ is the arriving alternating voltage amplitude and $\delta$ the damping decrement produced, then the voltage amplitude appearing at the electrode will be $$E = \frac{\Delta e \pi}{\delta}.$$

If $\delta$ can be reduced to $10^{-4}$, amplification of the voltage will be 30,000 fold.

The undamping and detection take place in the following manner: When weak alternating potentials pass to the grid and braking electrode, the reverse surfaces, both of which are moved toward the cathode, and of which that in the space between the cathode and the grid is nearer the cathode, will be displaced in rhythm with the alternating voltage, so that the oscillating electrons which do not return to the cathode will land in proper phase on the grid. Through this phase-correct contact the unloaded oscillatory circuit is impelled to high oscillatory amplitudes. The detecting operation is as follows:

A portion of the oscillating electrons is taken up again by the cathode, and the remaining part will arrive in proper phase on the grid and thus produce an undamped oscillatory circuit. The current selected by the cathode is dependent upon the amplitude of the ultra-high frequency alternating voltage impressed upon the oscillatory system. Owing to this changing cathode selection, the emission current impinging upon the grid is low-frequency modulated if the oncoming high frequency discloses a modulation. The grid current reaches its maximum value when the modulation of the ultra-high frequency is zero and decreases with increasing modulation.

Inasmuch as the circuit between the braking electrode and the cathode is always without current, the rectified amplifier low frequency currents can be taken off only in the circuit between the grid electrode and cathode by take-off resistance or transformers.

The sensitivity of the arrangement can be increased still more if the electrodes are supplied with a weak high frequency alternating voltage. On account of the high frequency displacement of the cathode reversing surface, conditions of maximum sensitivity can be continually imparted and thus become effective.

The present invention is also characterized in that once the operative conditions are selected, the optimum stimulation of the oscillatory circuit takes place. In addition, since detection depends directly on the ultra-high frequency excitation, the optimum of the detection coincides with the optimum of the ultra-high frequency excitation. Loading of the oscillating circuit by the low frequency also does not take place here.

Figure 2:
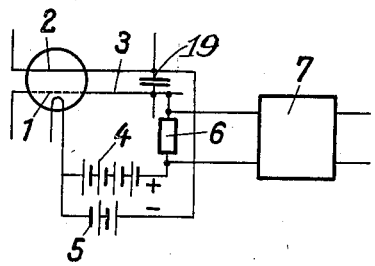
Fig. 2 is a diagrammatic view of a triode tube having a braking field circuit, and having an oscillatory circuit connected between the grid electrode and the braking electrode.
Figure 3:
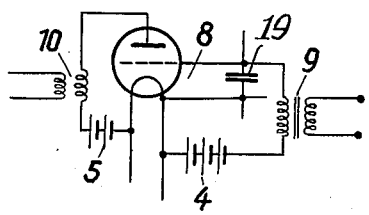
Fig. 3 is a similar view of a modified form of my invention in which the oscillatory circuit is connected between the grid electrode and the cathode.
Figure 4:
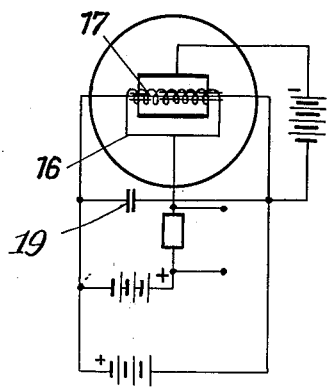
Fig. 4 is a similar view of another modified form of my invention in which a closed oscillatory circuit is formed by means of a short circuited spiral circuit.

Figs. 2 to 4 show how circuits may be constructed to apply the principles described.

With special reference to Fig. 2, there is shown a triode tube in a braking field circuit, in which the grid electrode 1 receives a high positive potential through the grid battery 4 over the determining resistance 6. The braking electrode 2 is given a high negative potential through the battery 5. Instead of these batteries use can be made of any other type of potential source. The negative potential source between the braking electrode and the cathode is selected so great that the circuit between the braking electrode and the cathode passes no current, produced by the electrons oscillating in the interior of the tube. The ultra-high frequency oscillatory circuit is formed by an ultra-short wave receiver dipole, the braking electrode 2, the grid electrode 1 and a parallel wire system connected with these electrodes, which is tuned to the corresponding receiving frequency by a condenser 19 which short-circuits this parallel wire system and is slidable thereon. The potentials at the grid electrode and the braking electrode are also set according to the receiver waves to be amplified and detected. The potential at the braking electrode 2, is, however, so great that none of the electrons oscillating in the tube can impinge upon it.

The amplified and detected receiver oscillation is taken off at the ends of the resistance 6 as low frequency A. C., as the circuit between the braking electrode and the cathode carries no current, and passed through the low frequency amplifier, designated by the rectangle 7, for further amplification.

In the circuit of Fig. 2 the receiver oscillations of the braking electrode are impressed on the grid electrode. Fig. 3 shows a triode tube, likewise consisting of braking electrode, grid electrode, and cathode, in which the receiver oscillations of the braking electrode are impressed upon the cathode, and in which the ultra-high frequency oscillatory circuit 8 comprises the grid electrode, the cathode and a connected parallel wire system which is also bridged by a condenser 19 for tuning to a certain frequency. The inlet circuit can be fed over a high frequency transformer 10 with a weak high frequency alternating potential, whereby sensitivity is increased. The auxiliary alternating potentials imparted to the grid and braking electrode cause the reversing surfaces constantly to shift to and fro in ryhthm with these auxiliary oscillations, so that the tube is constantly rhythmically in the state of greatest receiving sensitivity. The grid electrode of the tube on Fig. 3 receives its high positive potential through the battery 4 over the primary coil of the outlet transformer 9. The braking electrode receives its high negative potential through the battery 5 over the secondary winding of the high frequency transformer 10. The negative potential source between the braking electrode and the cathode is selected so great, that the braking electrode is given such a high negative potential and the circuit between the braking electrode and the cathode carries no current.

Fig. 4 shows a third means using a triode tube for carrying out the method of the invention, the braking electrode of which is provided with the high negative braking electrode potential. In this triode tube the spiral circular grid electrode, short circuited by a yoke, forms the ultra-high frequency oscillatory circuit 16. The other electrodes and sources of voltage are arranged as in the preceding modifications. The spiral circuit can oscillate at its fundamental wave or at an overtone, so that potential nodes and loops alternate on the spiral. Improving and rectifying is therefore simultaneously effected side by side at the various potential loops. Owing to irregularities in the construction of the electrodes, not all places will cooperate equally well, and better results are obtained if excitation takes place only at one potential loop, preferably point-like. This can be obtained, for example, by causing the cathode to emit only at 17. According to this arrangement the ultra-high frequency short-circuiting condenser is located in one of the circuits.

The method of operating this braking field receiving tube in connection with the new receiving method is, fundamentally, one in which the ultra-high frequency oscillations coming to the receiver circuit are very greatly amplified and detected. Through the successive, phase-correct pendular movement of the electrons in the tube and through the phase-correct impulsion of the ultra-short wave oscillatory circuits, the oscillation to be amplified is rocked to and fro, which causes a great increase in amplification, as the oscillatory circuit is not damped, and thusly its resonance amplitude is not opposed by a damping load which otherwise would reduce the oscillation amplitude. Detection takes place in the manner described in that, according to the strength of the modulation of the received oscillation and according to the consequent to and fro shifting of the reversing surfaces, particularly of those between the cathode and the grid electrode, a more or less greater part of the electrons passing from the cathode fall on the grid electrode and produce a low frequency current corresponding to the envelope of the modulated oscillations. In the circuit for carrying out the new method, therefore, the amplified detected low frequency between grid electrode and cathode is taken off by means of a resistance or a transformer.

The oscillatory circuits shown in the examples can of course be undamped so as to serve as transmitters.

I claim:—

1. The method of operating a triode tube having a cathode, a grid electrode, and a braking electrode, in a braking field circuit to receive ultra-short waves, which comprises applying a negative potential to the cathode, applying a positive potential to the grid electrode so that current flow is obtained between the grid electrode and the cathode, applying a high negative potential to the braking electrode to preclude current flow from the braking electrode to the cathode, applying ultra-high frequency received waves to said tube, and tapping off low frequency waves created between the cathode and the grid electrode.

2. A system for detecting and amplifying ultra-high frequency waves by means of a triode tube in a braking field circuit, said tube having a cathode, electrode, a grid electrode, and a braking electrode, which comprises an ultra-high frequency circuit connected between said grid and an electrode, an initial circuit connected between said grid and an electrode, means in said initial circuit to determine detected and amplified low frequency currents, potential source means providing said cathode with a negative potential, said grid with a positive potential, and said braking electrode with a high negative potential relative to said cathode to preclude a current flow from said braking electrode to said cathode.

3. A system for detecting and amplifying ultra-high frequency waves by means of a triode tube in a braking field circuit, said tube having a cathode, a grid electrode adjacent said cathode, and a braking electrode separated from said cathode by said grid, which comprises an ultra-short wave oscillatory circuit connected between said grid and said braking electrode, and consisting of a tunable parallel wire system, an initial circuit between said grid and said cathode resistance means interposed in said initial circuit for determining detected and amplified low frequency currents, and potential source means interposed between said cathode and said grid, and between said cathode and said braking electrode, said grid receiving from said potential means a positive potential relative to the cathode, and said braking electrode receiving from said potential means a high negative potential relative to said cathode to preclude current flow from said braking electrode to said cathode.

4. A system for detecting and amplifying ultra-high frequency waves by means of a triode tube in a braking field circuit, said tube having a cathode, electrode, a grid electrode adjacent said cathode, and a braking electrode separated from said cathode by said grid, an ultra-short wave oscillatory circuit connected between said grid and an electrode, and consisting of a tunable parallel wire system, an input circuit between said braking electrode and said cathode, a secondary winding of a high frequency transformer interposed in said input circuit, the primary winding of said transformer being connected with a source of a weak high frequency alternating potential, an output circuit interposed between said grid and said cathode, a winding of a low frequency transformer interposed in said output circuit and adapted to determine detected and amplified low frequency currents, and potential source means between said cathode and said grid and between said cathode and said braking electrode, said grid receiving from said potential means a positive potential relative to said cathode, and said braking electrode receiving from said potential means a high negative potential relative to said cathode to preclude a current flow from said braking electrode to said cathode.

5. A system for detecting and amplifying ultra-short waves by means of a triode tube in a braking field circuit, said system comprising a tube having a cathode, a grid electrode adjacent said cathode, and a braking electrode separated from said cathode by said grid, said grid being in the form of a wire spiral, said spiral being short-circuited by a yoke and adapted to be an ultra-short wave oscillatory circuit within said tube, and upon which potential loops and potential nodes are formed, said cathode being covered to emit only at the point of a potential loop in a point-like manner, an output circuit between said grid and said cathode, a resistance in said output circuit to determine detected and amplified low frequency currents, and potential source means between said cathode and said grid and between said cathode and said braking electrode, said grid receiving from said potential means a positive potential relative to said cathode, and said braking electrode receiving from said potential means a high negative potential relative to said cathode to preclude a current flow from said braking electrode to said cathode.

KARL KOHL.